United States Patent [19]

Roe et al.

[11] Patent Number: 4,693,423

[45] Date of Patent: Sep. 15, 1987

[54] POWER PAINT SPRAYER

[75] Inventors: Elverton O. Roe; C. Gregg Moore, both of Wooster, Ohio

[73] Assignee: The Wooster Brush Company, Wooster, Ohio

[21] Appl. No.: 832,598

[22] Filed: Feb. 25, 1986

[51] Int. Cl.⁴ ........................ B05B 9/043; F16B 37/08

[52] U.S. Cl. .................................... 239/332; 239/375; 239/525; 239/600; 411/433

[58] Field of Search ................ 222/153, 383; 220/322, 220/324; 248/223.4; 403/13, 14, 330; 239/397, 390, 442, 660, 526, 531, 551, 332, DIG. 14, 525, DIG. 22, 104, 119, 375; 411/432, 433, 437, 512

[56] References Cited

U.S. PATENT DOCUMENTS

| | | | |
|---|---|---|---|
| 1,596,461 | 8/1926 | Schoefield | 220/324 |
| 2,269,847 | 1/1942 | Feinson | 248/223.4 |
| 2,567,683 | 9/1951 | Taminga | 222/383 X |
| 2,999,646 | 9/1961 | Wagner | 239/332 |
| 3,116,879 | 1/1964 | Wagner | 239/332 |
| 3,445,068 | 5/1969 | Wagner | 239/332 |
| 3,462,082 | 8/1969 | Everett | 239/351 X |
| 3,899,134 | 8/1975 | Wagner | 239/350 X |
| 3,952,955 | 4/1976 | Clements | 239/288.5 |
| 3,985,322 | 10/1976 | Mabuchi et al. | 248/224.2 X |
| 4,036,438 | 7/1977 | Soderlind | 239/288.5 |
| 4,160,525 | 7/1979 | Wagner | 239/332 |
| 4,319,731 | 3/1982 | Pfeifer | 248/223.4 |
| 4,364,520 | 12/1982 | Weber | 239/332 X |
| 4,442,977 | 4/1984 | Beiswenger et al. | 239/332 |
| 4,516,724 | 5/1985 | Hellman | 239/114 |

FOREIGN PATENT DOCUMENTS

| | | | |
|---|---|---|---|
| 1114598 | 12/1981 | Canada | 239/288 |

*Primary Examiner*—Andres Kashnikow
*Assistant Examiner*—Kevin Patrick Weldon
*Attorney, Agent, or Firm*—Renner, Otto, Boisselle & Lyon

[57] ABSTRACT

Power paint sprayer includes a power handle assembly and a separately detachable pump and container assembly. The pump housing has a bail pivotally connected to opposite sides thereof for pivotal movement into and out of locking engagement with a detent on the top of the power handle assembly to detachably hold the pump housing up against the bottom of the power handle assembly. The pump housing may be cast in one piece and has a longitudinal bore extending therethrough in which a pump cylinder is permanently affixed using a suitable adhesive/sealant. The pump piston is driven by an oscillating armature whose movements are limited by a stroke limiting screw thus to limit the stroke of the pump piston. The stroke limiting screw threadedly engages a split nut held together by a pair of O-rings that apply a friction load on the stroke limiting screw to prevent creep thereof due to vibrations and the like. A slot may be provided in the bottom wall of the motor housing adjacent the back edge of the pump housing to prevent any liquid leakage from the pump from flowing down into the sprayer handle. Also, a safety guard having finger grips on opposite sides thereof may be attached to a nozzle nut threadedly connected to the outer end of the pump barrel to facilitate unscrewing of the nozzle nut by hand.

25 Claims, 6 Drawing Figures

FIG. 2
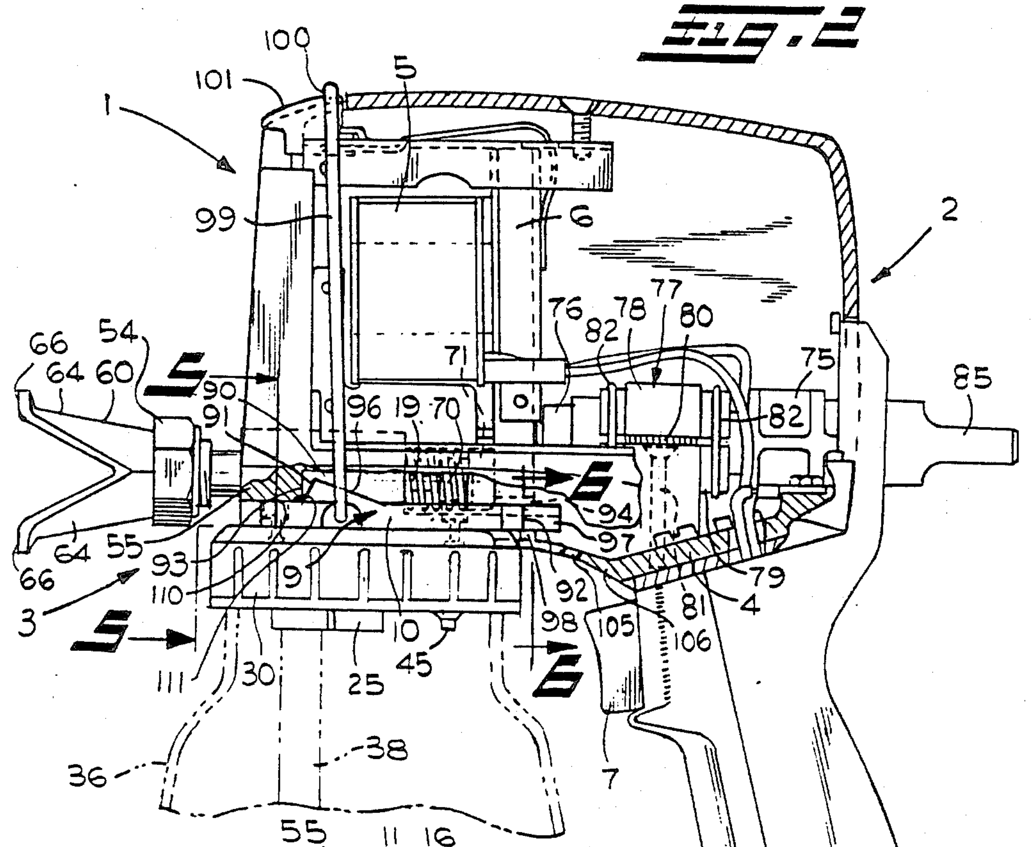
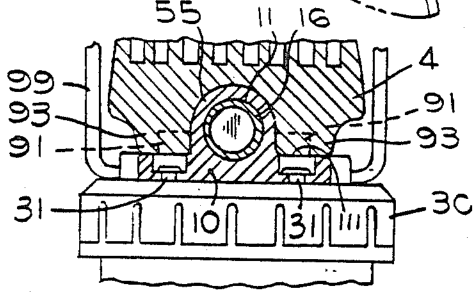
FIG. 5
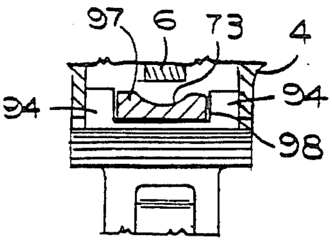
FIG. 6

POWER PAINT SPRAYER

BACKGROUND OF THE INVENTION

This invention relates generally as indicated to a power paint sprayer, particularly of the type including a power handle assembly and a separately detachable pump and container assembly which is adapted to be quickly and easily detached from the power handle assembly to facilitate clean-up after use and reattached for reuse. The power paint sprayer can be used to spray many types of materials including oil enamels, primers, sealers, stains, varnish, latex enamels, latex flat, oil-base paints, and acrylic latex.

It is generally known, for example, from U.S. Pat. No. 3,899,134 to make the pump and container assembly of a power paint sprayer as a separate unit from the power handle assembly so that the pump and container assembly can be removed for ease of cleaning. The power paint sprayer of the present invention is of the same general type but differs in the manner in which the pump and container assembly is constructed and how the pump and container assembly is detachably mounted on the power handle assembly. Also, the power paint sprayer of the present invention includes a novel adjustment mechanism for adjusting the stroke of the pump piston and a novel safety guard for the spray nozzle.

SUMMARY OF THE INVENTION

According to the present invention, in one aspect thereof, the power handle assembly includes a motor housing having a bottom recess open at the front for receipt of the pump housing therein, with axially spaced apart, oppositely facing end walls on the pump housing and motor housing which vertically overlap each other when the assembly is complete to prevent relative axial movement therebetween. A flange on the back wall of the pump housing is received in a notch adjacent the back edge of the motor housing recess to prevent downward movement of such back wall relative to the motor housing. Also, a bail pivotally connected to opposite sides of the pump housing forwardly of the back flange is pivotally movable into and out of locking engagement with a detent on the top of the motor housing to detachably hold the pump housing up against the bottom of the motor housing.

In accordance with another aspect of the invention, the pump housing is desirably cast in one piece and has a longitudinal bore extending therethrough in which a pump cylinder is permanently affixed using a suitable adhesive/sealant.

In accordance with a further aspect of the invention, the motor housing may be riveted or otherwise secured to the top surface of the container lid, such rivets also desirably serving to attach a vent plate to the underside of the cover top.

In accordance with still another aspect of the invention, the pump drive motor includes an oscillating armature for driving the pump piston, and a stroke limiting screw for limiting the movement of the armature thus to limit the stroke of the piston. The stroke limiting screw threadedly engages a split nut held together by a pair of O-rings that apply a friction load on the stroke limiting screw to prevent creep thereof due to vibrations and the like.

In accordance with a further aspect of the present invention, a slot may be provided in the bottom wall of the motor housing adjacent the back edge of the pump housing receiving recess to prevent any liquid leakage from the pump from flowing down into the sprayer handle where it could cause an electrical short.

In accordance with yet another aspect of the invention, the spray nozzle may be retained in place by a nozzle nut which has a safety guard thereon with finger grips on opposite sides of the safety guard to facilitate unscrewing of the nozzle nut by hand.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

BRIEF DESCRIPTION OF THE DRAWINGS

In the annexed drawings:

FIG. 2 is an enlarged fragmentary longitudinal section through the power paint sprayer of FIG. 1;

FIGS. 5 and 6 are fragmentary transverse sections through the motor and pump housings of FIG. 2 respectively taken generally along the planes of the lines 5—5 and 6—6 thereof.

DETAILED DESCRIPTION OF THE PREFERRED EMBODIMENT

Figure 1:
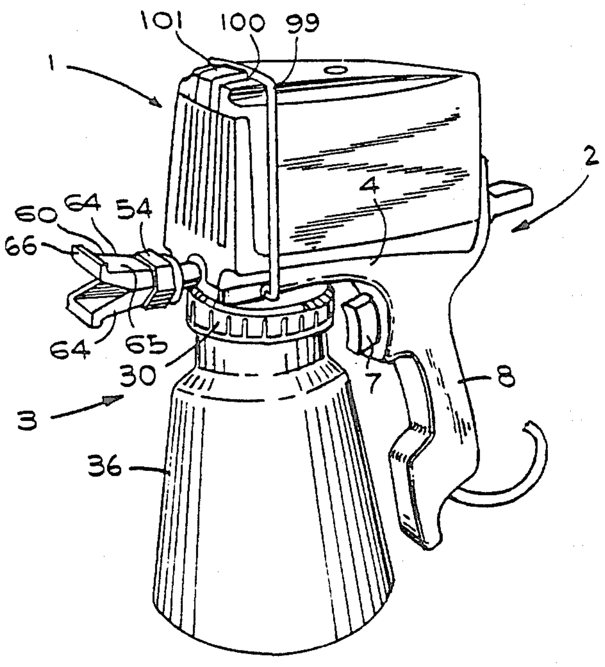
FIG. 1 is a perspective view of a preferred form of power paint sprayer in accordance with this invention as seen from the left front.

Referring now in detail to the drawings, and initially to FIGS. 1 and 2, a preferred form of power paint sprayer of the present invention is generally indicated by the reference numeral 1 and includes two main assemblies, a power handle assembly 2 and a pump and container assembly 3 detachably mountable thereon in a manner to be subsequently described. The power handle assembly 2 includes a motor housing 4 in which is mounted an electromagnet 5 and associated armature 6 that oscillates back and forth when alternating current is applied to the electromagnet as by actuation of a switch 7 in a depending handle portion 8 to power the pump 9 shown in detail in FIGS. 3 and 4.

The pump 9 is of course part of the pump and container assembly 3, and includes a pump housing 10 which is desirably cast in one piece, with a longitudinal bore 11 extending therethrough. The bore 11 is desirably stepped intermediate the ends thereof to provide an internal rearwardly facing shoulder 15 for engagement by a pump cylinder 16. The pump cylinder 16 may be permanently affixed within the longitudinal bore 11 using a suitable adhesive/sealant, and has a machined bore 17 therethrough for receipt of a pump piston 19 which defines with the wall of the pump cylinder a variable volume paint chamber 20 forwardly of the pump piston. Along the axial length of the pump cylinder is an inlet orifice 21 (see FIG. 4) for supplying paint or other liquid being pumped to the pump chamber 20 and a larger drain opening 22 rearwardly spaced therefrom. The inlet orifice 21 and drain opening 22 respectively communicate with a pair of passages 23 and 24 in a downwardly extending projection 25 on the pump housing 10 when the pump cylinder 16 is properly oriented with respect thereto. For that purpose, a key 26 may be provided on the pump cylinder 16 for receipt in a keyway 27 in the pump housing.

Figure 4:
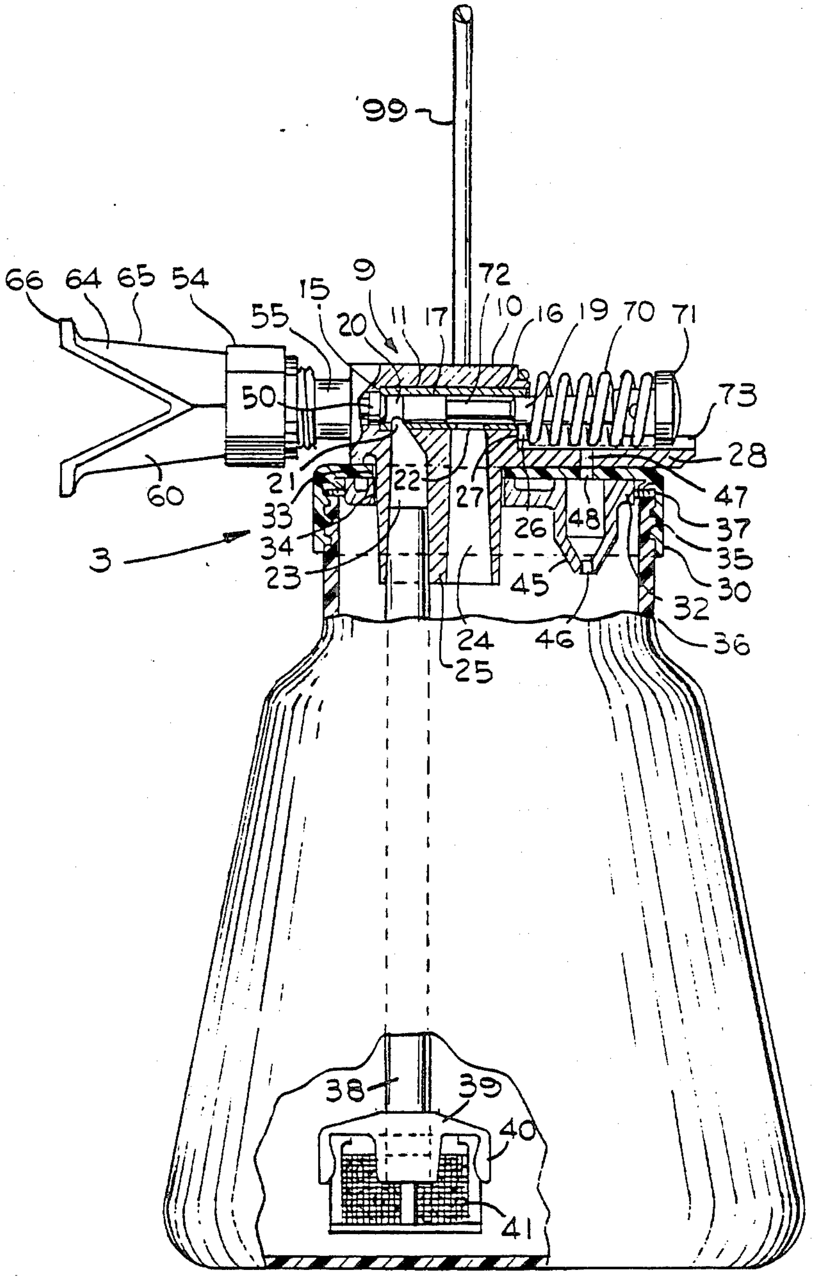
FIG. 4 is an enlarged fragmentary longitudinal section through the pump and container assembly for such power paint sprayer.

The pump housing 10 is permanently affixed to the top 28 of the container lid 30 as by means of a plurality of rivets 31 which may also be used to secure a vent plate 32 to the underside of the lid as seen in FIG. 4. Both the lid 30 and vent plate 32 have aligned slots 33, 34 therein for extension of the pump housing part 25 containing the passages 23, 24 therethrough. The side wall 35 of the lid is internally threaded for threaded attachment onto the exteriorly threaded upper end of the container 36. Also, a gasket 37 may be inserted against the underside of the lid between the threaded side wall and outer diameter of the vent plate 32 for engagement by the upper edge of the container 36 to form a fluid-tight seal.

The inlet passage 23 in the pump housing 10 leading to the pump inlet orifice 21 is desirably tapered to facilitate insertion of an inlet tube 38 therein. As seen in FIG. 4, the inlet tube 38 extends outwardly into the container 36 and may have a flange 39 on the lower end thereof with flexible fingers 40 around the periphery of the flange for frictionally attaching a removable filter 41 thereto.

On the underside of the vent plate 32 is a vent tube 45 having a vent hole 46 therein communicating with aligned vent holes 47, 48 in the pump housing 10 and lid top 28 for venting the interior of the container 36 to the atmosphere.

An outlet valve 50 is urged into seated engagement with a valve seat 51 at the forward end of the pump cylinder 16 by a spring 52 held in place within the forward reduced diameter portion 53 of the pump housing passage 11 by a nozzle nut 54 threaded onto the forwardly protruding end of the pump barrel 55. The nozzle nut 54 may also be used to mount a swivel head 56 within the forward end of the passage 11 and a spray tip 57 which is received within a central opening 58 in the nozzle nut 54. Preferably, the swivel head 56 has a stepped rearward end 59 which acts as a retainer for the spring 52. Also, a tip guard assembly 60 is desirably provided on the forward end of the nozzle nut 54 to act as a warning device and provide some protection against a person placing a hand, finger or other body part directly in front of the spray tip 57 during operation.

Figure 3:
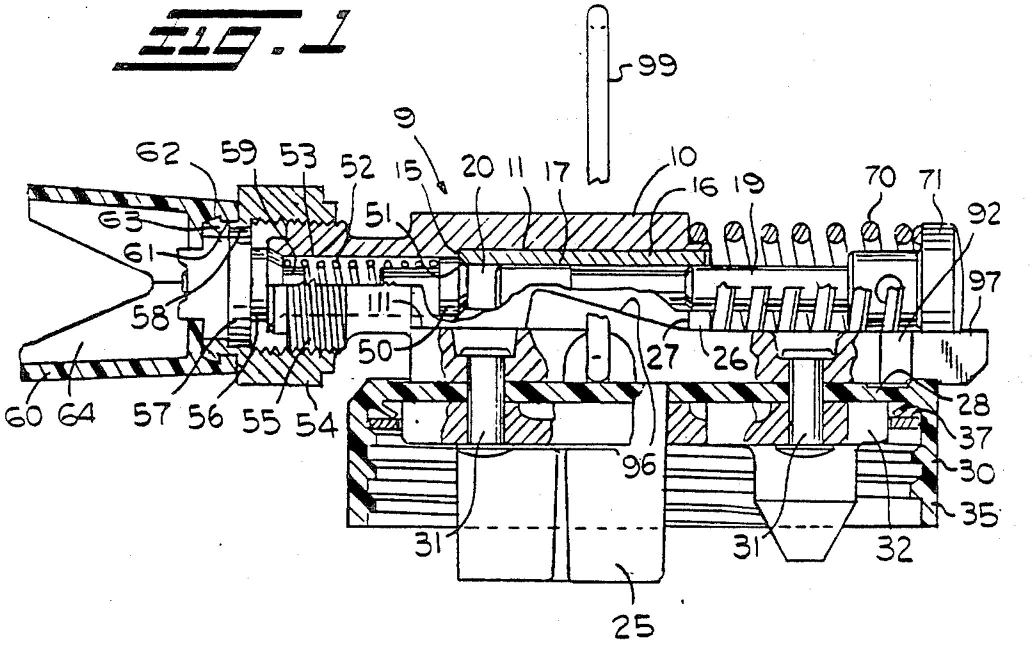
FIG. 3 is a further enlarged fragmentary longitudinal section through the pump assembly and container lid of such power paint sprayer.

As seen in FIG. 3, the tip guard assembly 60 has a central opening 61 in the inner end thereof which is undercut at 62 for snapping engagement over a ribbed shoulder 63 on the outer end of the nozzle nut 54. Extending axially forwardly from the tip guard assembly is a pair of oppositely outwardly tapering fingers 64 which taper away from the central opening 61 so as not to interfere with the spray pattern produced by the spray tip 57. The externally facing opposite sides 65 of the tip fingers 64 are desirably relatively flat and have outturned flanges 66 on the outer ends thereof to provide finger grips to facilitate unscrewing of the nozzle nut 54 by hand for ease of replacement of the spray tip 57 and/or swirl head 56 and cleaning of the various pump parts after each use.

When the pump and container assembly 3 is attached to the power handle assembly 2 in the manner illustrated in FIG. 2, the pump piston 19 is biased against the forwardly facing side of the motor armature 6 by a return spring 70 interposed between the pump barrel 55 and a cap 71 on the rearwardmost end of the piston. In operation, when the hand switch 7 is depressed, the electromagnet 5 will be energized by alternating current, causing the armature 6 to reciprocate. Movement of the armature to the left drives the pump piston 19 to the left as viewed in FIG. 2. This displaces the paint or other liquid in the pumping chamber 20 to the left (see FIG. 3), causing the outlet valve 50 to open and the paint to be discharged through the swivel head 56 and spray tip 57. During this pressure stroke of the pump piston 19, the inlet orifice 21 (FIG. 4) is clsoed by the pump piston to prevent paint from flowing back into the container 36. When the alternating current reverses, the return spring 70 causes the piston 19 to retract and return the armature 6 to its original position. As the piston retracts, first the outlet valve 50 closes. Then the piston 19 uncovers the inlet orifice 21 and creates a vacuum, causing paint to flow up through the inlet tube 38 into the pumping chamber 20 for subsequent discharge during the next pumping stroke. Any paint that leaks back around the pump piston 19 will collect within an external groove 72 on the piston in alignment with the drain openings 22, 24 in the pump cylinder 16 and pump housing 10 for drainage back to the container 36. A rounded channel or groove 73 may be provided in the pump housing 10 to the rear of the pump barrel 55 in coaxial alignment with the pump piston 19 to provide sliding support for the piston cap 71 during reciprocal movement of the pump piston.

A stroke limiting screw 75 may be provided on the motor housing 4 for adjusting the stroke of the pump piston 19 to regulate the amount of paint or other liquid that is drawn into the pump chamber 20 during each suction stroke of the piston. As seen in FIG. 2, the stroke limiting screw 75 extends longitudinally of the motor housing 4 and has a bumper 76 on the forward end thereof for engagement with the back side of the armature 6 substantially in line with the piston 19. The stroke limiting screw may be rotatably supported within the motor housing 4 by a split nut 77 including upper and lower nut halves 78, 79 each having threaded engagement with opposite sides of a threaded portion 80 on the stroke limiting screw intermediate the ends thereof.

The lower nut half 79 may be securely attached to the motor housing 4 as by means of a pair of screws 81. Also, the two nut halves 78, 79 are held together by a pair of rubber O-rings 82 extending around opposite ends thereof which bias the upper nut half and correspondingly the lower nut half into engagement with the stroke limiting screw threads 80 to apply a friction load to the stroke limiting screw preventing creep of the screw due to vibrations and the like. The stroke limiting screw 75 extends through an opening in the back of the sprayer handle 8 and has an adjustment knob 85 on the rearmost end thereof to permit the stroke limiting screw to be rotated by hand causing axial movement thereof toward and away from the armature 6 to limit its rearward movement as desired.

As will be apparent, the container 36 itself may be unscrewed from the lid 30 for refilling and/or cleaning while the pump 9 and lid are still attached to the power handle assembly 2. Also, for ease of cleaning of the pump and container assembly 3 and/or replacement of parts, the pump and container assembly is desirably quickly and easily detachable from the power handle assembly 2 as a unit. To that end, the motor housing 4 has an open front bottom recess 90 for receipt of the pump housing 10 therein with the rearmost end of the pump piston 19 in engagement with the front facing side of the armature 6. To retain the pump housing 10 against longitudinal movement within the motor housing recess 90, both the pump housing and motor housing recess have a pair of axially spaced apart oppositely facing end walls 91, 92 and 93, 94 on opposite sides of the pump housing and recess which vertically overlap each other when the pump housing is properly inserted within the motor housing recess. As clearly shown in FIGS. 2, 5 and 6, there are two such end walls 91 and 92 on the pump housing on opposite sides of the pump cylinder barrel 55. Likewise, the end walls 93 and 94 on the motor housing 4 straddle the pump barrel 55 for engagement with the respective end walls 91 and 92 on the pump housing. Also, the forwardmost end walls 93 on the motor housing 4 and associated end walls 91 on the pump housing 10 are desirably at a higher elevation than the other end walls 92, 94, and there is a tapered ramp 96 on each side of the pump cylinder barrel 55 leading up to the raised end walls 91 to facilitate camming of the pump housing 10 into the motor housing recess 90 in a manner to be subsequently described.

During assembly, the power handle assembly 2 should be held at a slight upward angle relative to the pump and container assembly 3 to facilitate insertion of a pump housing flange 97 at the back end of the pump housing into a notch 98 at the back of the motor housing recess 90 between the end walls 94 and above the bottom wall 106 of the motor housing 4. Then the power handle assembly 2 should be pushed forward and downward relative to the pump and container assembly 3 until the front end walls 93 on the motor housing ride up along the ramp surfaces 96 on the pump housing and down into engagement with the associated pump housing end walls 91. This brings locating surface 110 (FIGS. 2 and 5) on the power handle assembly 2 into abutting engagement with the locating surface 111 on the pump and container assembly 3. When the locating surfaces 110 and 111 are held in such engagement relative vertical movement between the power handle assembly 2 and container assembly 3 is prevented. To this end a locking bail 99, which is pivotally connected to opposite sides of the pump housing 10 forwardly of the pump housing flange 97, is swung over the forward end of the power handle assembly 2 into locking engagement with a detent 100 on the top surface of the power handle assembly to hold the pump housing up against the bottom of the motor housing. Forwardly of the detent is a cam surface 101 to facilitate camming of bail 99 into and out of locking engagement with detent 100. To remove the pump and container assembly from the power handle assembly, the bail 99 is simply pushed forward out of the detent position, whereupon the pump housing 10 is free to drop out of the motor housing recess 90.

To ensure against any leakage of paint or other liquid down into the handle portion 8 of the power handle assembly 2 where it could cause an electrical short or other possible damage, a slot 105 is desirably provided in the bottom wall 106 of the motor housing 4 rearwardly of the motor housing recess 90 (see FIG. 2). Normally, any paint leakage around the pump piston 19 will be returned to the container 36 through the drain openings 22, 24 in the manner previously described. However, if excess leakage should occur, such slot 105 will prevent the paint from entering the handle as aforesaid.

Although the invention has been shown and described with respect to a certain preferred embodiment, it is obvious that equivalent alterations and modifications will occur to other skilled in the art upon the reading and understanding of the specification. The present invention includes all such equivalent alterations and modifications, and is limited only by the scope of the claims.

We claim:

1. Sprayer apparatus comprising a pump and container assembly including a pump housing containing a liquid pump and a container for the liquid to be sprayed suspended from said pump housing, a separate power handle assembly including a motor housing containing motor means for driving said pump, said pump housing and said power handle assembly having oppositely facing locating surfaces, and mounting means for detachably mounting said pump housing to said motor housing, said mounting means including a bottom recess in said motor housing for receipt of said pump housing, a flange on said pump housing and a notch in said motor housing, said flange and notch being formed to permit said flange to be inserted into said notch with said locating surfaces initially at an angle to each other and thereafter to be pivoted so as to bring said locating surfaces into abutting engagement, and a bail pivotally connected to said pump housing for pivotal movement into locking engagement with a bail retention surface on said power handle assembly thereby to hold said locating surfaces in engagement with each other to limit relative vertical movement between said pump housing and said power handle assembly.

2. The sprayer apparatus of claim 1 wherein said bail retention surface comprises a bail detent on the top of said power handle assembly in substantially vertical alignment with said bottom recess in said motor housing.

3. The sprayer apparatus of claim 2 further comprising a cam surface on said power handle assembly for camming said bail into engagement with said detent.

4. The sprayer apparatus of claim 1 wherein said pump housing and motor housing recess have respective axially spaced apart, oppositely facing end walls which vertically overlap when said pump housing is inserted into said recess to prevent relative axial movement between said pump housing and motor housing.

5. The sprayer apparatus of claim 4 wherein said notch in said motor housing is adjacent the back edge of said bottom recess, and said flange is on the back wall of said pump housing, said flange extending into said notch when said pump housing is inserted into said bottom recess as aforesaid, the pivotal connection between said bail and pump housing being axially spaced from said flange on said pump housing.

6. The sprayer apparatus of claim 5 further comprising ramp means on said pump housing between said pump housing end walls to facilitate camming of said pump housing into said motor housing recess following insertion of said flange into said notch.

7. The sprayer apparatus of claim 1 wherein said pump housing is a one-piece casting containing a longitudinal bore having a step intermediate the ends thereof, and said pump includes a pump cylinder bonded to said bore against said step, and a pump piston axially movable within said pump cylinder, said pump piston defining with the wall of said pump cylinder a variable volume pump chamber forwardly of said pump piston.

8. The sprayer apparatus of claim 7 wherein said pump cylinder has an inlet orifice communicating with said pump chamber and a drain opening rearwardly spaced therefrom, and said pump housing includes separate passage means respectively communicating with said inlet orifice and drain opening, said passage means extending downwardly for extension into the interior of said container.

9. The sprayer apparatus of claim 8 wherein said container includes a removable lid, and said pump housing is permanently attached to the top side of said lid with said passage means extending through said lid for extension into said container.

10. The sprayer apparatus of claim 9 further comprising a vent plate attached to the underside of said lid, said vent plate, pump housing and lid having aligned vent holes extending therethrough for venting the interior of said container to the atmosphere.

11. The sprayer apparatus of claim 10 wherein common rivets secure said pump housing and vent plate to opposite sides of said lid.

12. The sprayer apparatus of claim 1 wherein said pump housing includes a pump barrel having a liquid discharge opening at the outer end thereof, a nozzle nut threadedly attached to said outer end of said pump barrel, and a tip guard assembly attached to the outer end of said nozzle nut, said tip guard assembly having a central opening therethrough, and a pair of oppositely outwardly tapering fingers which taper away from said central opening so as not to interfere with the spray pattern from said liquid discharge opening, said fingers having relatively flat oppositely facing external sides, and outturned flanges on the outer ends of said external sides to provide finger grips to facilitate unscrewing of said nozzle nut by hand.

13. The sprayer apparatus of claim 12 wherein said nozzle nut has an externally ribbed shoulder on the outer end thereof, and said central opening in said tip guard assembly is undercut for snapping engagement over said ribbed shoulder.

14. The sprayer apparatus of claim 1 further comprising slot means in the bottom wall of said motor housing adjacent the back edge of said bottom recess for preventing any liquid leakage from said pump from entering the handle portion of said power handle assembly.

15. Sprayer apparatus comprising a pump and container assembly including a pump housing containing a liquid pump and a container for the liquid to be sprayed suspended from said pump housing, a separate power handle assembly including a motor housing containing motor means for driving said pump, and mounting means for detachably mounting said pump housing to said motor housing, said mounting means including a bottom recess in said motor housing for receipt of said pump housing, and a bail pivotally connected to said pump housing for pivotal movement into and out of locking engagement with a bail retention surface on said power handle assembly, said motor means including an electromagnet and associated armature that reciprocates when an alternating current is applied to said electromagnet, said pump including an axially movable pump piston, and spring means for biasing said pump piston into engagement with one side of said armature when said pump housing is inserted in said motor housing recess, and said power handle assembly including a stroke limiting screw movable toward and away from the opposite side of said armature for limiting the movement of said armature in a direction away from said pump piston, and split nut means yieldably biased into frictional engagement with opposite sides of said stroke limiting screw for applying a friction load to said stroke limiting screw to prevent creep of said stroke limiting screw due to vibrations and the like.

16. The sprayer apparatus of claim 15 wherein said split nut means includes upper and lower nut halves each having threaded engagement with opposite sides of said stroke limiting screw, one of said nut halves being attached to said motor housing, and means for resiliently biasing said other nut half toward said one nut half and into frictional engagement with said stroke limiting screw.

17. The sprayer apparatus of claim 16 wherein said means for resiliently urging comprises an O-ring encircling said nut halves.

18. The sprayer apparatus of claim 17 wherein there are two of said O-rings encircling opposite ends of said nut halves.

19. Sprayer apparatus comprising a pump and container assembly including a pump housing containing a liquid pump and a container for the liquid to be sprayed suspended from said pump housing, and a power handle assembly including a motor housing containing motor means for driving said pump, said motor means including an electromagnet and associated armature that reciprocates when an alternating current is applied to said electromagnet, and said pump including an axially movable pump piston, and spring means for biasing said pump piston into engagement with one side of said armature, and said power handle assembly including a stroke limiting screw movable toward and away from the opposite side of said armature for limiting the movement of said armature in a direction away from said pump piston, and split nut means biased into frictional engagement with opposite sides of said stroke limiting screw for applying a friction load to said stroke limiting screw preventing creep of said stroke limiting screw due to vibrations and the like.

20. The sprayer apparatus of claim 19 wherein said split nut means includes upper and lower nut halves each having threaded engagement with opposite sides of said stroke limiting screw, one of said nut halves being attached to said motor housing, and means for biasing said other nut half toward said one nut half and into frictional engagement with said stroke limiting screw.

21. The sprayer apparatus of claim 20 wherein said means for resiliently biasing comprises a pair of O-rings encircling opposite ends of said nut halves.

22. Sprayer apparatus of claim 19 wherein, said pump housing comprises a one-piece casting containing a longitudinal bore having a step intermediate the ends thereof, and said pump includes a pump cylinder bonded in place in said bore against said step, and said pump piston being axially movable within said pump cylinder, said pump piston defining with the wall of said pump cylinder a variable volume pump chamber forwardly of said pump piston.

23. The sprayer apparatus of claim 22 wherein said pump cylinder has an inlet orifice communicating with said pump chamber and a drain opening rearwardly spaced therefrom, and said pump housing includes separate passage means respectively communicating with said inlet orifice and drain opening, said passage means extending downwardly for communication with the interior of said container.

24. The sprayer apparatus of claim 23 wherein said container includes a removable lid, said pump housing being permanently attached to the top side of said lid with said passage means extending through said lid for communication with the interior of said container.

25. The sprayer apparatus of claim 24 further comprising a vent plate attached to the underside of said lid, said vent plate, pump housing and lid having aligned vent holes therethrough for venting the interior of said container to the atmosphere.

* * * * *